(12) United States Patent
Rivers

(10) Patent No.: US 6,866,475 B2
(45) Date of Patent: Mar. 15, 2005

(54) FAN ASSEMBLY FOR USE IN POWERED AIRBORNE VEHICLES

(76) Inventor: John F. Rivers, 62757 Constantine Rd., Constantine, MI (US) 49049

( * ) Notice: Subject to any disclaimer, the term of this patent is extended or adjusted under 35 U.S.C. 154(b) by 0 days.

(21) Appl. No.: 10/179,424

(22) Filed: Jun. 25, 2002

(65) Prior Publication Data

US 2003/0235495 A1 Dec. 25, 2003

(51) Int. Cl.$^7$ ............................................. F04D 29/18
(52) U.S. Cl. .................................... 415/173.3; 415/914
(58) Field of Search .......................... 415/173.1, 173.3, 415/914; 244/13, 52; 60/226.1, 269

(56) References Cited

U.S. PATENT DOCUMENTS

| | | | |
|---|---|---|---|
| 3,620,640 A | * | 11/1971 | Soulez-Lariviere ......... 415/126 |
| 3,934,410 A | * | 1/1976 | Williams ..................... 60/269 |
| 4,349,313 A | * | 9/1982 | Munroe et al. .......... 415/173.4 |
| 5,007,870 A | | 4/1991 | Okubo et al. |
| 5,141,173 A | | 8/1992 | Lay |
| 5,620,153 A | | 4/1997 | Ginsberg |
| 5,653,579 A | * | 8/1997 | Glezer et al. ............. 415/173.1 |
| 5,791,138 A | | 8/1998 | Lillibridge et al. |
| 5,901,924 A | | 5/1999 | Strieber |
| 6,254,032 B1 | | 7/2001 | Bucher |
| 6,508,624 B2 | * | 1/2003 | Nadeau et al. ............ 415/173.3 |

* cited by examiner

Primary Examiner—Edward K. Look
Assistant Examiner—Dwayne White
(74) Attorney, Agent, or Firm—King & Jovanovic, PLC

(57) ABSTRACT

A fan assembly for use in association with an airborne vehicle, the fan assembly comprising a propeller assembly and a shroud. The propeller assembly is rotatably coupled to an output shaft of a motor. The propeller assembly includes at least two blades each having a first end proximate an output shaft of a motor and a second end distally spaced therefrom. The shroud extends circumferentially around the propeller assembly, and includes a groove along the lower surface thereof. In turn, the second end of the at least two blades extends at least partially into the groove.

8 Claims, 4 Drawing Sheets

FAN ASSEMBLY FOR USE IN POWERED AIRBORNE VEHICLES

BACKGROUND OF THE INVENTION

1. Field of the Invention

The invention relates in general to a fan assembly, and more particularly, to a fan assembly for use in powered airborne vehicles. Such devices include, but are not limited to, powered parachute devices as well as other related airborne vehicles.

2. Background Art

The use of personal airborne vehicles has become increasingly popular. In particular, such airborne vehicles include, but are not limited to, powered parachutes and ultralight aircraft. These vehicles utilize an internal combustion engine which is connected to a fan assembly providing the necessary thrust. Generally, the fan is positioned behind the user of the vehicle and, in certain instances, within a shroud. The shroud is utilized to increase the performance of the fan.

While these fan assemblies (both shrouded and unshrouded) provide adequate power for the above-described vehicles, they suffer from certain drawbacks. In particular, these drawbacks include excessive noise, low efficiency, safety concerns, poor ground clearance, stability and size. Overcoming these drawbacks will provide a significantly improved airborne vehicle, wherein the internal combustion motor size and noise can be reduced, safety can be increased, and the entire fan assembly can be diminished in size.

Accordingly, it is an object of the present invention to overcome the deficiencies identified above.

It is a further object of the present invention to provide for optimization of fan assemblies of airborne vehicles.

These and other objects of the present invention will become apparent in light of the specification and claims appended hereto.

SUMMARY OF THE INVENTION

The invention comprises a fan assembly. The fan assembly is designed for use in association with an airborne vehicle and comprises a propeller assembly and a shroud. The propeller assembly is rotatably coupled to an output shaft of a motor. The propeller assembly includes at least two blades each having a first end proximate the output shaft of the motor and a second end distally spaced therefrom. The shroud extends circumferentially around the propeller assembly, and includes a groove along the lower/inner surface thereof. In turn, the second end of each of the at least two blades extends at least partially into the groove.

In a preferred embodiment, the fan assembly further comprises a filler assembly positioned within the groove. The filler assembly cooperates with the second ends of the at least two blades. In one such embodiment, the filler assembly comprises a fibrous material within the groove. For example, the fibrous material comprises a brush-like material.

In another embodiment, the cross-sectional configuration of the shroud comprises an airfoil shape. In another embodiment, the propeller assembly comprises at least three blades.

In one embodiment, the groove comprises a substantially uniform depth.

In another embodiment, the groove includes a leading side and a following side. The leading side of the groove includes a depth greater than that of the following side.

In another aspect of the present invention, the invention includes a fan assembly for use in association with an airborne vehicle having a propeller assembly and a shroud. The shroud extends circumferentially around the propeller assembly and includes means for reducing at least one of end effects and vortices proximate the second ends of each of the at least two blades.

In one embodiment, the reducing means comprises a groove along the lower surface thereof, wherein the second ends of the at least two blades extend at least partially into the groove.

In another embodiment of the present invention, the reducing means further comprises a filler assembly positioned within the groove. In one such embodiment, the reducing means further comprises a filler assembly positioned on a lower surface of the shroud.

In another aspect of the present invention, the shroud includes means for reducing the tolerances between the shroud and the second ends of the at least two blades.

In one embodiment, the tolerance reducing means comprises a groove along the lower surface of the shroud, wherein the second end of the at least two blades extends at least partially into the groove.

BRIEF DESCRIPTION OF THE DRAWINGS

The invention will now be described with reference to the drawings wherein.

DETAILED DESCRIPTION OF THE INVENTION

Figure 1:
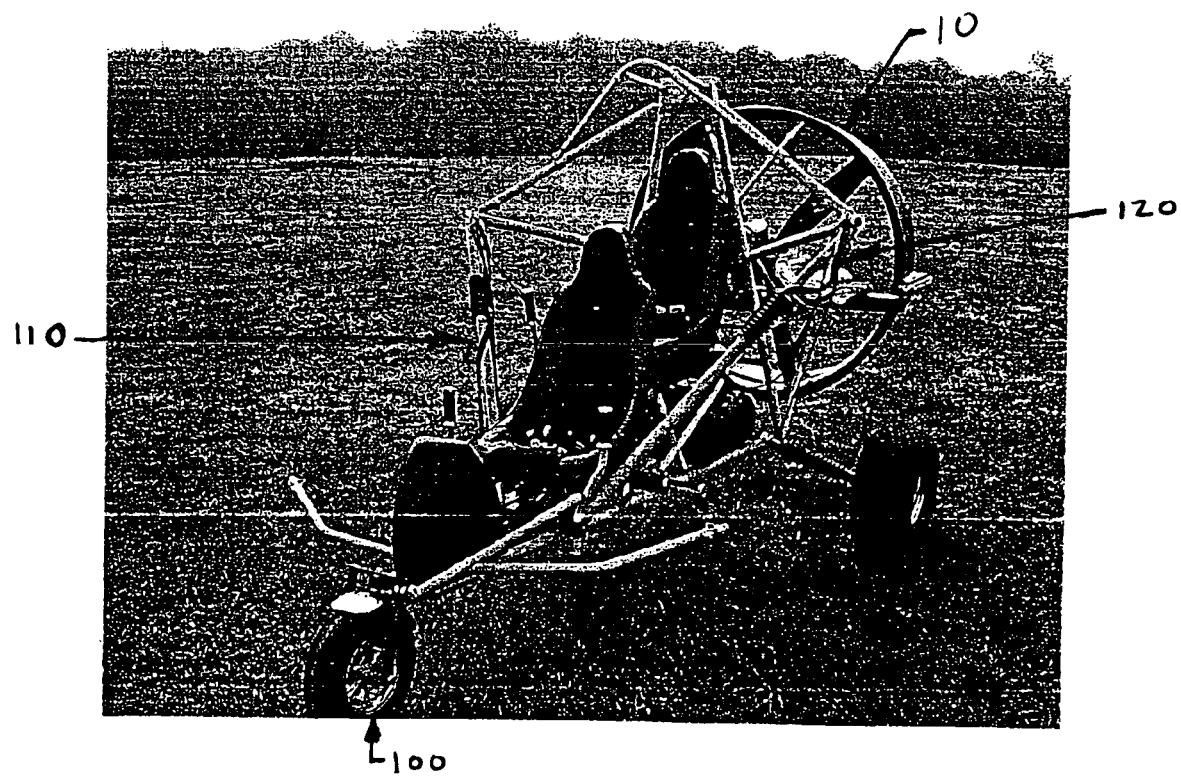
FIG. 1 of the drawings is a perspective view of an airborne vehicle having a fan assembly of the present invention.

While this invention is susceptible of embodiment in many different forms, there is shown in the drawings and will herein be described in detail, one specific embodiment with the understanding that the present disclosure is to be considered as an exemplification of the principles of the invention and is not intended to limit the invention to the embodiment illustrated.

Figure 2:
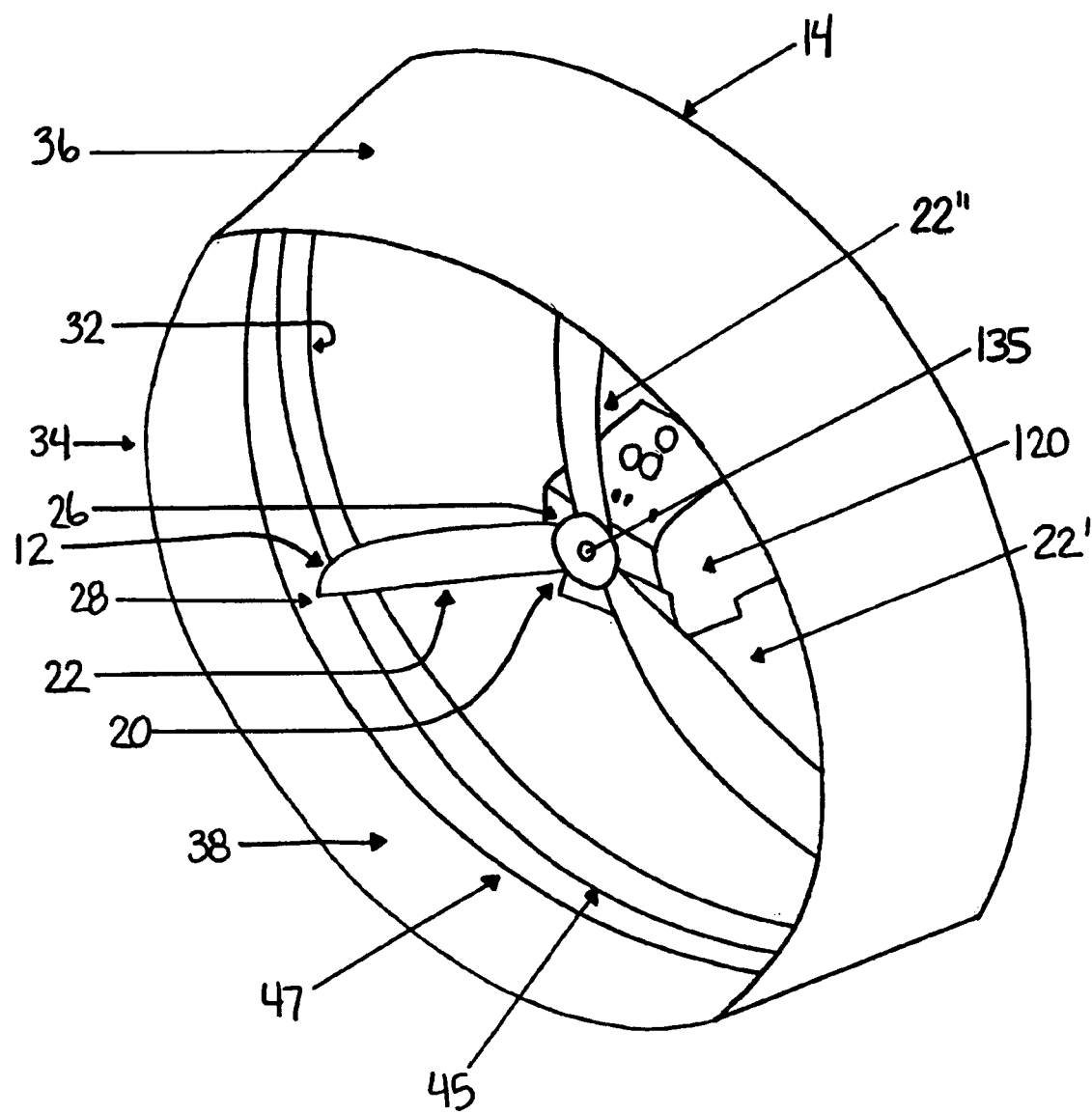
FIG. 2 of the drawings is a perspective view of a fan assembly with a motor.

Referring now to the Figures, and in particular to FIG. 1, a fan assembly is shown at 10. Such a fan assembly is generally well suited for use in association with airborne vehicle 100. For example, airborne vehicle 100 may include body/chassis 110, power supply 120 and a parachute attached to the body/chassis (not shown). As is shown in FIG. 2, power supply 120 generally comprises an internal combustion engine having a desired output, and includes output shaft 135. Generally such an internal combustion engine comprises a two to four cylinder four cycle motor.

Fan assembly 10 is shown in FIG. 2 as comprising a propeller assembly 12 and shroud 14. Propeller assembly 12 includes central hub 20 and a plurality of blades, such as blade 22. Blades 22 are each connected, at a first end 26 thereof, to hub 20 and include second ends 28 extending radially outward. While various configurations are contemplated, in the embodiment shown, a propeller assembly 12 includes three virtually identical blades 22, 22' and 22" which are spaced 120 degrees apart from each other about hub 20. Of course, a greater or fewer number of blades may be associated with the hub.

Figure 3:
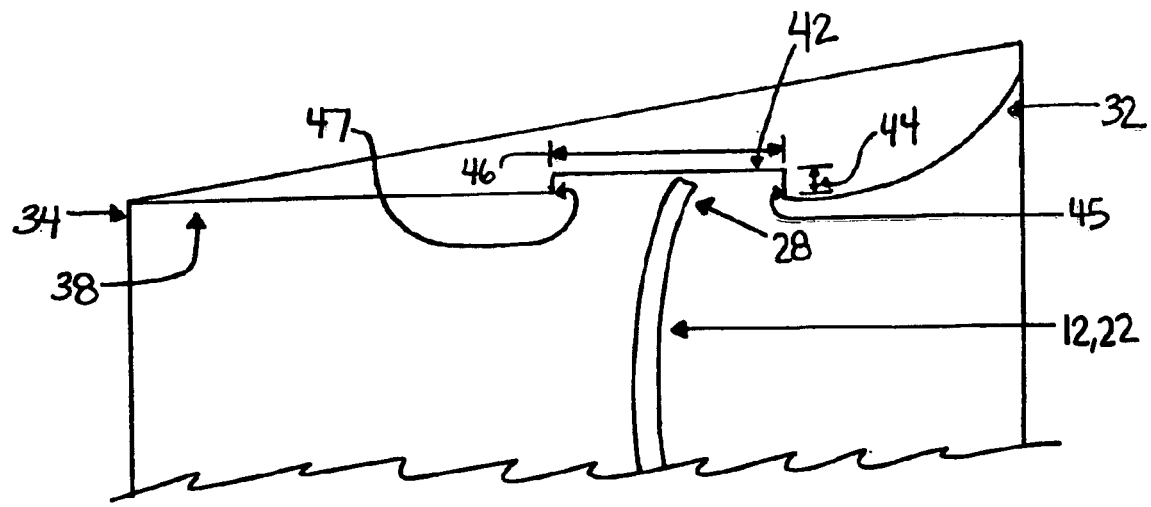
FIG. 3 of the drawings is a partial cross-sectional view of a shroud, showing, in particular, the interaction of blades of a propeller assembly with a groove of the shroud.
Figure 4:
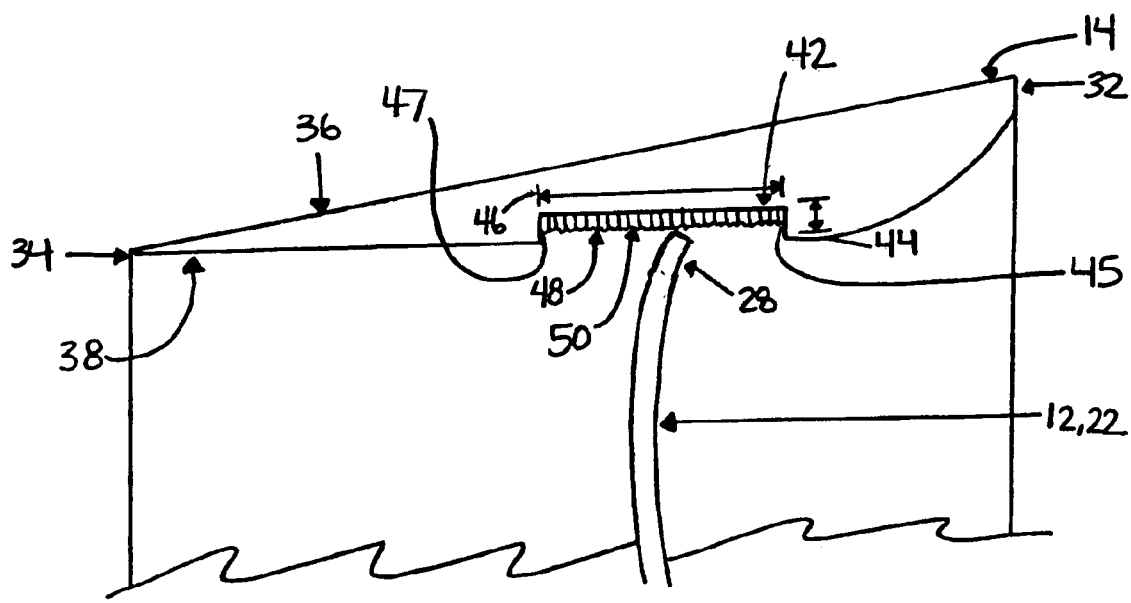
FIG. 4 of the drawings is a partial cross-sectional view of a shroud, showing, in particular, the interaction of blades of a propeller assembly with a groove and filler assembly of the shroud.
Figure 5A:
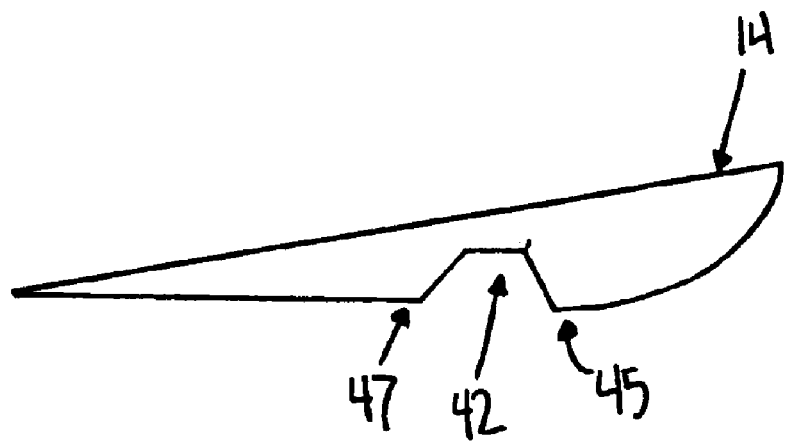
FIGS. 5a–5d of the drawings are partial cross-sectional views of a lower surface of a shroud, showing, in particular, different groove configurations.
Figure 5B:
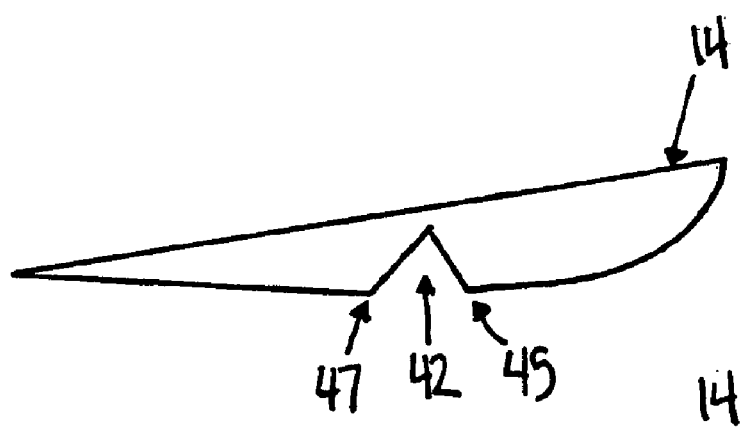
Figure 5C:
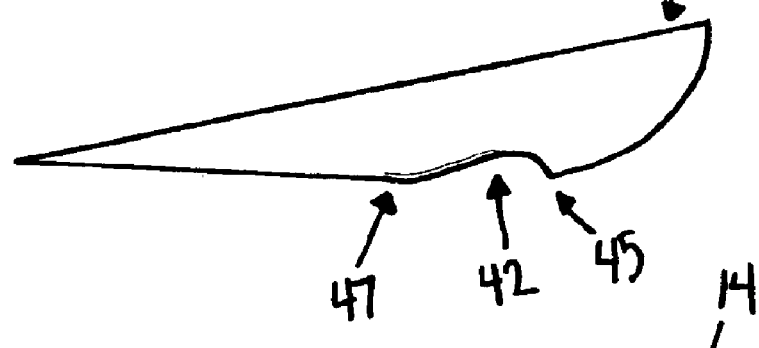
Figure 5D:
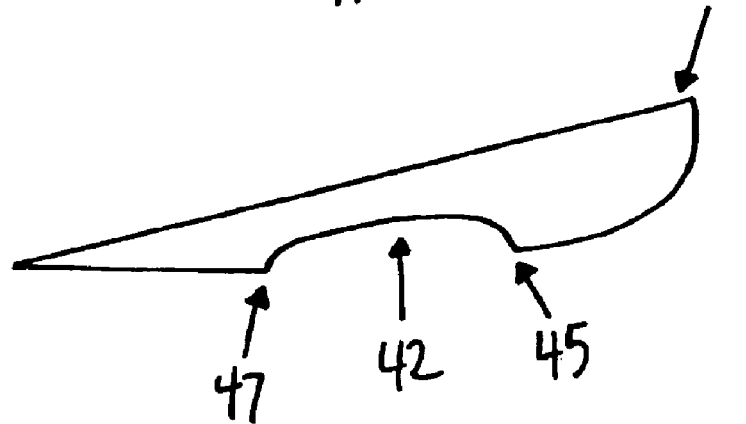

As shown in FIGS. 2–4, shroud 14 comprises a substantially cylindrical member circumferentially encircling a propeller assembly 12, having a particular diameter and width. In particular, shroud 14 comprises leading edge 32, trailing edge 34, upper (outer) surface 36, and lower (inner) surface 38. Various widths of the shroud (i.e., the distance between the leading edge and the trailing edge) are contemplated in the present invention. In addition, various cross-sectional airfoil shapes can be formed by the cooperation of the leading and trailing edges and the upper and lower surfaces of shroud 14. Generally, the shroud is made from a material such as fiberglass, carbon fiber composites and/or aluminum, however, other materials having favorable strength to weight ratios are likewise contemplated.

Lower surface 38 is shown in detail in FIGS. 3 and 4 as including groove 42 positioned along lower surface 38, substantially corresponding to the location of blades 22, and filler assembly 48 (FIG. 4). Groove 42 includes leading side 45, following side 47, depth 44 and width 46. Groove 42 is of a dimension to receive a portion of second ends 28 of blades 22 during the spinning thereof about hub 20. While various different configurations are contemplated for use, the groove that has been utilized in testing generally comprises a width of about 4" and a depth of about 2" wherein the depth is substantially uniform across the groove. Of course, and as shown in FIGS. 5a through 5d, various groove configurations are contemplated for use, such as grooves of differing cross-sectional configurations as well as grooves having varying depths at the leading and following sides thereof. Indeed, in certain embodiments, it is contemplated that the groove may have a depth at leading side 45, and, no depth at following side 47 such that it may be flush with lower surface 38 proximate following side 47.

Filler assembly 48 is shown in FIG. 4 as comprising a fibrous material 50 which extends from lower surface 38 in a substantially radially inward direction. While various embodiments are contemplated, fibrous material 50 is shown as comprising a flexible brush-like material. The filler assembly substantially precludes the passage of air beyond second ends 28 of the blades, while only negligibly contacting and affecting the rotation of the blades. In certain embodiments, it is contemplated that the filler assembly may be deeper than the depth of the groove, and, in turn, may extend outwardly beyond the confines of the groove.

Advantageously, second ends 28 of the blades extend beyond the lower surface of the shroud and proceed into the groove of the shroud, and, in turn, air is substantially precluded from passing through the shroud around the second ends 28 of the blades, without traversing the rotating blades. As such, the groove provides a means for reducing end effects and/or vortices at the second end of the blades.

Moreover, the groove configuration comprises means for reducing tolerances between the blade and the shroud. In particular, due to the groove configuration, the acceptable tolerances between lower surface 38 and the blades are more forgiving (i.e. reduced) than the interface tolerances of a conventional shroud and blade configuration. This is because in a conventional shroud blade interface, as the second end of the blade moves away from the shroud, efficiency quickly degrades. To the contrary, as long as the blade extends into the groove and is not directly exposed to incoming air, movement of the second end of the blade away from lower surface 38 of the shroud does not have such a substantial incremental degradation in efficiency.

Such a design has a multitude of benefits. First, noise is greatly reduced with the introduction of the groove (and further reduced with the inclusion of the filler assembly). Second, thrust provided by the blades is greatly increased. In turn, the size of the internal combustion engine can be decreased and greater fuel efficiency can be realized. Third, by placing the second ends within the grooves, the tips are encased by the shroud, lessening the chances of accidental contact therewith.

Certain tests were attempted comparing an embodiment with a shroud to an embodiment wherein the shroud further includes a groove in accordance with the present invention. The tests compared noise levels as well as thrust levels available utilizing identical internal combustion motors. It was found that the inclusion of a groove in accordance with the present invention reduced noise levels from 120 db to 102 db. Additionally, thrust increased from approximately 200 lbs. to approximately 320 lbs., representing an increase of over 50%.

The foregoing description merely explains and illustrates the invention and the invention is not limited thereto except insofar as the appended claims are so limited, as those skilled in the art who have the present disclosure before them will be able to make modifications without departing from the scope of the invention.

What is claimed is:

1. A fan assembly for use in association with an airborne vehicle, the fan assembly comprising:

a propeller assembly rotatably coupled to an output shaft of a motor, the propeller assembly including at least two blades each having a first end proximate an output shaft of a motor and a second end distally spaced therefrom; and a shroud extending circumferentially around the propeller assembly, the shroud including a groove along the lower surface thereof, the groove further includes a leading side and a following side, the leading side of the groove having a depth greater than that of the following side, wherein the second ends of the at least two blades extend at least partially into the groove.

2. The fan assembly of claim 1, wherein the shroud includes a cross-sectional configuration, the cross-sectional configuration comprising an airfoil.

3. The fan assembly of claim 1, wherein the groove comprises a substantially uniform depth.

4. The fan assembly of claim 1, wherein the propeller assembly comprises at least three blades.

5. The fan assembly of claim 1, further comprising a filler assembly positioned within the groove, the fill material cooperating with the second ends of the at least two blades.

6. The fan assembly of claim 5, wherein the filler assembly comprises a fibrous material within the groove.

7. The fan assembly of claim 6, wherein the fibrous material comprises a brush-like material.

8. The fan assembly of claim 6, wherein the fibrous material comprises a brush-like material.

* * * * *